Figure 1:
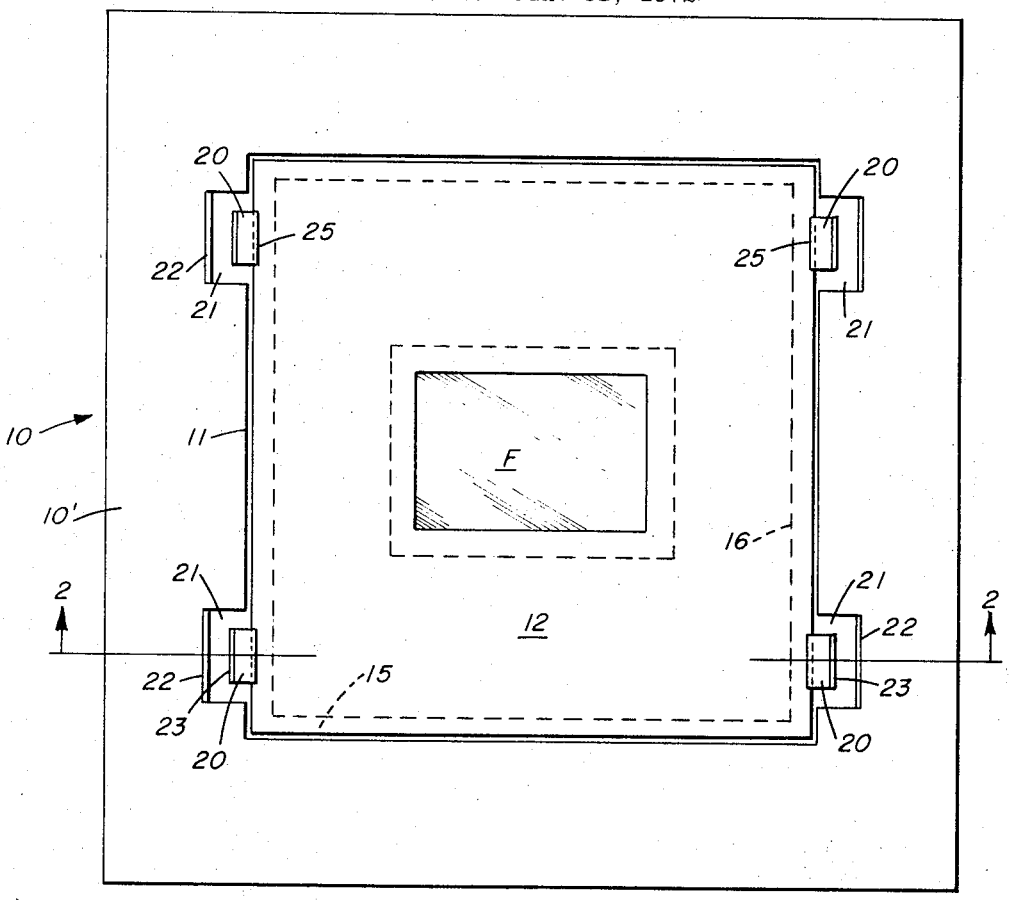
Figure 2:
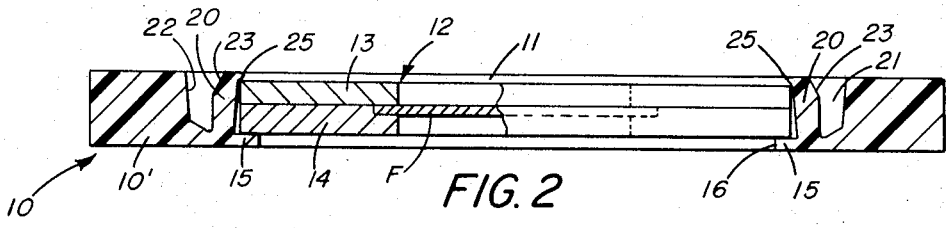

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 16, 1974

921 O.G. 866

T921,013
SLIDE ADAPTER
Archie J. Tucker, 1669 Lake Ave., Rochester, N.Y. 14650
Filed Jan. 31, 1972, Ser. No. 221,948
**Int. Cl. G03b *21/00;* G09f *1/10***
U.S. Cl. 353—120
1 Sheet Drawing. 8 Pages Specification

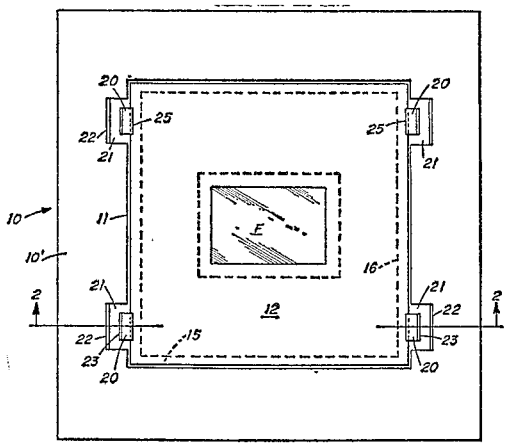

A slide adapter for interchangeably receiving relatively small transparency mounts and adapting them for use in a slide projector designed to accommodate larger transparency mounts. This adapter comprises a windowed frame member having overall dimensions comparable to the larger transparency mounts and having a recess in one face thereof into which the smaller transparency mount can be inserted flatwise. The smaller transparency mount is held in this recess by a plurality of flexible fingers the free ends of which overhang the outer face of the relatively small transparency mount when it is properly seated in the recess of the adapter.

SLIDE ADAPTER

Filed Jan. 31, 1972